(12) United States Patent
Boon et al.

(10) Patent No.: US 6,325,273 B1
(45) Date of Patent: Dec. 4, 2001

(54) FRICTION WELDING APPARATUS AND METHOD

(75) Inventors: Terence Boon, Hitchin; Wayne M. Thomas, Suffold; Peter Temple-Smith, Cambridge, all of (GB)

(73) Assignee: The Lead Sheet Association, Pembury (GB)

(*) Notice: Subject to any disclaimer, the term of this patent is extended or adjusted under 35 U.S.C. 154(b) by 0 days.

(21) Appl. No.: 08/986,849

(22) Filed: Dec. 8, 1997

(30) Foreign Application Priority Data

Dec. 6, 1996 (GB) .................................. 9625393
Dec. 6, 1996 (GB) .................................. 96254040

(51) Int. Cl.[7] ............................. B23K 20/12; B23K 37/02
(52) U.S. Cl. .......................................... 228/112.1; 228/2.1
(58) Field of Search ................................. 228/112.1, 2.1

(56) References Cited

U.S. PATENT DOCUMENTS

| | | | |
|---|---|---|---|
| 3,555,239 | * | 1/1971 | Kerth ........................... 219/125 |
| 3,684,855 | * | 8/1972 | Wepfer et al. ..................... 219/73 |
| 3,702,914 | * | 11/1972 | Noura ............................. 219/73 |
| 3,718,798 | * | 2/1973 | Randolph et al. ................. 219/60 A |
| 3,727,025 | * | 4/1973 | Dibenedetto ....................... 219/73 |
| 3,789,181 | * | 1/1974 | Netterstedt et al. ................. 219/62 |
| 3,873,798 | * | 3/1975 | Friedman et al. ................. 219/60 A |
| 4,144,110 | * | 3/1979 | Luc ............................. 156/73.5 |
| 4,767,048 | * | 8/1988 | Kimbrough et al. ................ 228/29 |
| 5,460,317 | * | 10/1995 | Thomas et al. .................. 228/112.1 |
| 5,713,507 | * | 2/1998 | Holt et al. .................... 228/112.1 |
| 5,794,835 | * | 8/1998 | Colligan et al. .................. 228/2.1 |
| 5,796,068 | * | 8/1998 | Jones .......................... 219/121.63 |
| 5,813,592 | * | 9/1998 | Midling et al. ................. 228/112.1 |
| 5,829,664 | * | 11/1998 | Spinella et al. ................ 228/112.1 |
| 5,914,058 | * | 6/1999 | Sanders et al. ................ 219/124.45 |

FOREIGN PATENT DOCUMENTS

| | | | |
|---|---|---|---|
| 783225 | * | 9/1957 | (GB) . |
| 2306366 A | * | 5/1997 | (GB) ............................. 228/2.1 |
| 9310935 | | 6/1993 | (WO) . |
| WO 93/10935 | | 6/1993 | (WO) . |
| 9526254 | | 10/1995 | (WO) . |
| WO 95/26254 | | 10/1995 | (WO) . |

* cited by examiner

*Primary Examiner*—Tom Dunn
*Assistant Examiner*—Kiley Stoner
(74) *Attorney, Agent, or Firm*—Knobbe, Martens, Olson & Bear, LLP (57) ABSTRACT

A mobile friction welding machine is provided for creating friction weld joints in workpieces such as metal sheets, especially lead sheets is described. The machine has a track assembly to guide it across work pieces, including a caterpillar track system on the machine. The friction welding is achieved by rotating a probe and applying a downward load on the probe to urge it into the work process. The probe is preferably a pair of spaced apart probes having a crescent-shaped cross-section.

32 Claims, 7 Drawing Sheets

FRICTION WELDING APPARATUS AND METHOD

FIELD OF THE INVENTION

The present invention relates to a mobile friction welding machine. It is particularly applicable, but in no way restricted, to a mobile friction stir welding machine which is adapted for the joining of lead sheets to form a lap joint.

BACKGROUND TO THE INVENTION

The attractive properties of lead have been put to good use in the fabrication of all types of buildings from private houses to industrial complexes. Traditionally, when it is necessary to join lead the tried and trusted technique of lead burning is utilised. This joining method cannot be considered ideal because of the skill needed and the environmental and health problems that are associated with the fumes emitted. Furthermore, lead burning is a highly skilled job and there is a general shortage of skilled operators. As a consequence, the initial cost outlay for laying lead sheet as a continuous membrane is unattractive or uneconomic when compared with felt/bitumen alternatives. The initial installation cost outlay should not be the only factor used when comparing the two roofing systems. Felt roofs generally have a life expectancy of only 10–15 years whereas lead roofs last considerably longer. Over an extended period of say 20–100 years a lead roof is likely to be considerably more cost effective. However, the initial high installation costs still tend to discourage architects and builders from specifying lead as a flat roofing continuous membrane material of choice, despite its longevity and attractive physical appearance.

If a simple and cost-effective method of joining lead sheet were available, then this could change the economic equation in favour of lead sheet as a flat roof membrane material.

Possible alternatives to lead burning are friction welding and friction stir welding. The process of friction welding has been known for many years and typically involves causing relative movement between a pair of workpieces while they are urged together so as to generate a plasticised region, stopping the relative movement and allowing the plasticised region to solidify thereby joining the work pieces.

It has also been proposed in the past to join workpieces by use of a non-consumable member which does not form part of the finished joints. An example of this so-called friction stir butt welding technique can be seen in WO 93/10935 (The Welding Institute) and WO 95/26254 (NORSK HYDRO) in which two workpieces are urged together using various shaped tools which cause the region to be joined to plasticise and hence become joined. This technique allows sheet materials to be welded by a solid state process in either butt or lap geometries. The process operates by forcing a rotating tool with a specially shaped probe along the joint line, which causes intense plastic deformation of the immediate surrounding material. The tool is designed to prevent material escaping, and once the tool has passed a given point, a weld is made.

The leading edge of the rotating tool provides frictional heat and subsequent thermal softening in front of the tip, in effect preheating the area about to be bonded. This effect is especially useful in allowing the passage of the tip part of the rotating tool through the material. The greater the area of the shouldered region of the rotating tool in contact with the joint, then the greater the frictional heat available. However, increasing the diameter of the shoulder has practical limitations and tends to produce a side flash.

To date, this process has been successfully demonstrated for many aluminium alloys and also for thermoplastics. However, application of this process to lead sheet results in major difficulties because lead is relatively soft and malleable and the above techniques do not achieve satisfactory results in terms of weld acceptability.

Even if these problems were to be overcome, there is still no known portable machine which could be used on a lead roof to complete the necessary welds. By the very nature of a roof, the welding process must be carried out in situ. The precision required for this type of joint means that a handheld tool is quite inappropriate for forming a weld of any length. The object of the present invention is therefore to provide a method and apparatus which can be used to form welded joints of the type in question in situ.

SUMMARY OF THE INVENTION

According to a first aspect of the present invention, there is provided a mobile friction welding machine comprising:
  (i) a wheeled body adapted to support and carry a rotatable probe;
  (ii) a rotatable probe suitable for creating a friction weld joint in workpieces to be joined;
  (iii) a means of rotating the probe at speeds suitable for forming a joint region in the workpieces;
  (iv) a track assembly adapted to guide the friction welding machine across the workpieces;
  (v) a drive means attached to or associated with the body and adapted to drive the welding machine forward in use along the track assembly;
  (vi) a loading system adapted to place a downward load on the probe and to urge it into the workpieces;
the machine being adapted, in use, to move along the track assembly and to form a joint region in the workpieces as it moves.

For the first time there is provided a simple, portable machine that can be set to work on a roof comprising overlapping sheets of lead and which forms a joint as it traverses the roof on its tracks.

In a particularly preferred embodiment the welded body is fitted with endless articulated tracks.

In another embodiment the track assembly comprises a series of track sections joined together to form a track of the required length.

In this way a temporary track is laid out across the roof joint which requires welding, parallel to the desired joint line. The welding machine then moves along the joint region parallel to and guided by the track.

Preferably the drive means comprises an electric motor.

In a particularly preferred embodiment the drive means is pivotally mounted thus allowing the drive to flex with respect to changes in position of the track means, so accommodating any unevenness in the workpieces to be welded.

It is thus no longer necessary for the surface to be welded to be uniformly flat.

Preferably the loading system comprises a plurality of weights, the system thus being adapted to maintain the probe in the correct depth and orientation with respect to the workpieces.

Preferably the probe incorporates a probe head comprising a plurality of protrusions and in a particularly preferred embodiment the probe head comprises two crescent-shaped protrusions symmetrically displaced around the rotational axis of the probe.

Preferably the probe head is displaced from the plane perpendicular to the workpieces, the inclination being away from the general forward direction of travel of the machine.

Preferably the probe is displaced by 3°±2°.

The present invention also encompasses mobile welding machines using any probe suitable for use in a method of friction welding and is intended for use on any suitable workpiece material.

According to a second aspect of the present invention there is provided a method of friction welding suitable for joining workpieces and forming a joint region there between comprising the steps of:

(i) Offering a probe of material harder than the workpiece material to the workpiece surfaces in the joint region, a head region of the probe contacting one or both workpieces;

(ii) Causing a rotational movement between the probe and the workpieces while urging the probe and workpieces together whereby frictional heat is generated in the joint region so as to create a plasticised region in the workpieces around the probe;

(iii) Removing the probe or advancing the probe along the joint region and allowing the plasticised region to solidify and thereby join the workpieces together;

characterised in that the head region of the probe incorporates a plurality of protrusions adapted to penetrate the workpieces.

Moving from a single point probe to a multiprong whisk type tool causes plasticising material movement without causing melting of low-melting material such as lead, enabling a fault free joint to be made.

Preferably, when the workpieces are joined by a lap joint the protrusions are so sized and shaped that they fully penetrate the workpiece nearest the probe but only partially penetrate the other workpiece.

Not only does this achieve the optimum strength and appearance of the joint but it also ensures that the lower workpiece remains intact.

Preferably the protrusions are symmetrically displaced around the probe head about the rotational axis of the probe. This leads to smooth operation and prevents the tool from tending to drag to one side or the other.

Preferably the protrusions are substantially crescent-shaped in cross-sectional profile.

In a particularly preferred embodiment the concave surface of the crescent-shaped protrusions is directed substantially towards but displaced from the axis of rotation of the probe.

Preferably the probe head incorporates two protrusions.

Alternatively and for some applications the probe head may incorporate three or four protrusions.

Preferably the protrusions take the form of slightly tapering cylinders, the taper narrowing towards the tip of the protrusion. This facilitates penetration and ease of operation generally.

In a particularly preferred embodiment the head region of the probe is substantially convex in shape, the edge of the head i.e. the portion furthest from the rotational axis being in effect chamfered away from the workpiece. This allows the convex surface to the probe to cause a slight undercut in the lead. It is important that this convex surface is to the correct depth to ensure sufficient heat is generated in the lead to allow welding to occur.

Preferably the probe is slightly displaced, in use, from the plane perpendicular to the workpieces. This displacement is typically 3° from the plane perpendicular to the workpieces, the inclination being away from the general forward direction of travel of the probe. Angles that vary from 3° can be used and this will depend in part on the rotational speed of the probe and the speed of forward movement.

One advantage of this method is that it incorporates all the benefits of friction welding whilst providing excellent results on lead sheet for the first time. But the method is not restricted to lead. It applies equally well to other low-melting or soft materials such as thermoplastics.

The present invention also encompasses any probe suitable for use in a method of friction welding as described above and incorporating any of the features herein described.

BRIEF DESCRIPTION OF THE DRAWINGS

The invention will be further described, by way of example, with reference to the accompanying drawings in which.

DESCRIPTION OF THE PREFERRED EMBODIMENTS

Aspects and embodiments of the present invention are described below by way of example only. These examples represent the best ways of putting the invention into practice that are currently known to the Applicant although they are not the only ways in which this could be achieved.

Figure 1:
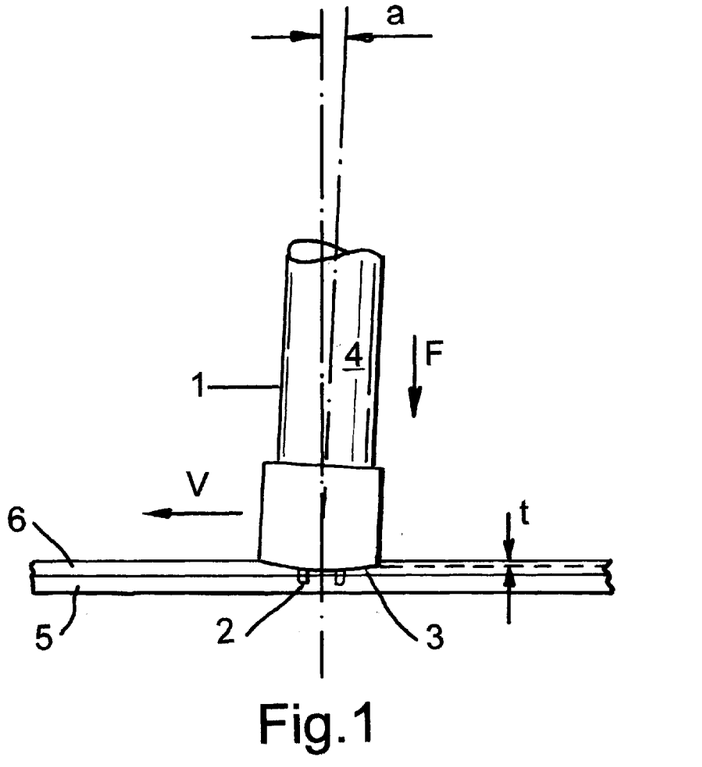
FIG. 1 shows a schematic side elevation of the welding apparatus employed in the present invention.
Figure 2:
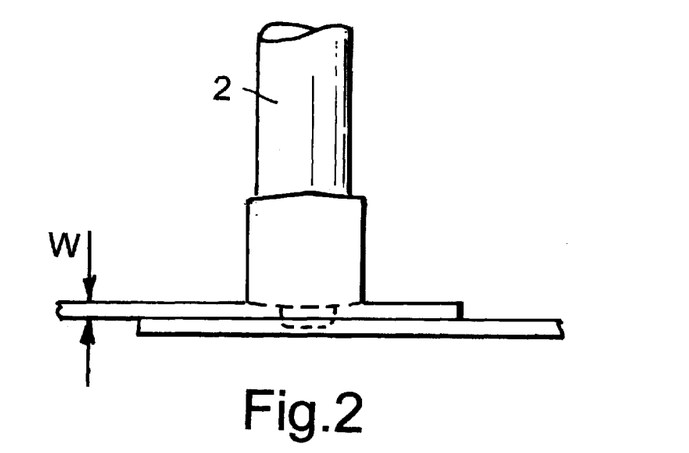
FIG. 2 shows diagramatically the depth to which the probe penetrates the workpieces.

Referring to FIG. 1, this illustrates a probe 1 made of hardened steel which incorporates two prongs or protrusions 2 in a head region 3 of the probe. Probes of this general type have been developed by The Welding Institute and others for friction welding aluminium and its alloys. However, tool design is critical for use with lead sheet and the multi-pronged tool is most important for effective weld formation.

In this method as illustrated, a pair of lead sheets 5, 6 are overlaid one on another in order to form a lap joint, the lower sheet 5 being placed on a firm substrate. The probe has a relatively narrow central or body region 4 which is adapted to fit into a rotating engine or motor of some description (not shown).

Figure 3:
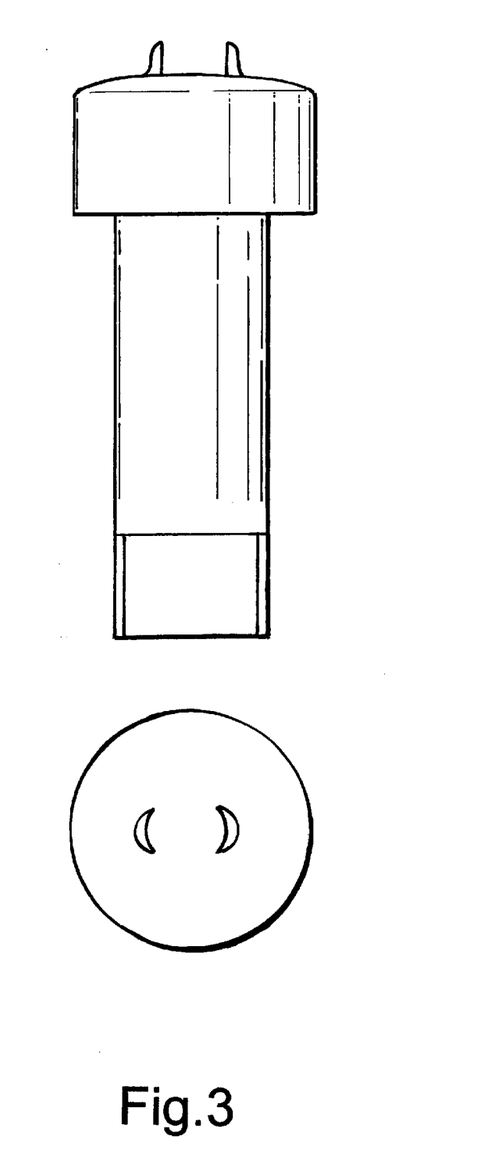
FIGS. 3, 4 and 5 show the head profiles of a number of different probes applicable to the present invention.

The probe head/prong dimensions are determined specifically for the thickness of sheet to be joined. In use, the prongs must fully penetrate the uppermost sheet and only partially penetrate the lowermost sheet 5, whilst the head of the probe causes a slight undercut into the lead sheet 6 by distance (t). To facilitate this, the head of the probe is preferably slightly convex in shape as shown in the various profiles in FIGS. 3, 4 and 5. In effect, the circumferential edge of head 3 is slightly chamfered away or radiused off. In use, the bottom face of the head thus makes good contact with the top sheet 6, as evidenced by a visibly polished zone along the centre of the joint region.

At the start of the welding procedure, the rotating probe may be introduced slowly into the lead sheet, giving time for plasticising to begin. Alternatively, a suitable hole can be drilled in one or both sheets or alternatively a run on tab and a run off tab could be provided.

Having entered the rotating probe into the two workpieces, the probe is arranged such that its axis of rotation is angled away from the plane perpendicular to the workpieces by angle "a". This arrangement is clearly shown in FIG. 1. The probe is then progressed in the direction of the forward arrow at a speed V whilst maintaining a substantially constant downward force F. As the probe moves forward the plasticised matter behind the probe sets and forms a joint between the two workpieces in a joint region which follows the path taken by the probe.

A large series of trials was undertaken to establish the optimum parameters for joining. The principle variables investigated were improvement to tool design, rotation speed, travel speed and angle of tilt of the tool. Essential parameters such as tool rotation speed and travel speed were measured for each run. Initially, welds were supported by a steel substrate. Later welds used substrates which were more typical of building practice, namely wooden roof boards of 18 mm thick marine WWP ply covered by a layer of commercial geotextile. The use of tarred building paper over wood and concrete were also briefly investigated.

Appropriate instrumentation and data retrieval software were used to measure and record the downforce, traverse force, rotational speed and current consumed during tool rotation and traverse.

All welds were examined visually to assess the quality and surface appearance. Selected visually satisfactory welds were further examined by X-ray in order to detect buried volumetric defects. Welds which were still considered satisfactory were subjected to a peel test to determine the relative strength of the weld. Peel tests were considered satisfactory when failure occurred through the parent material rather than through the weld itself.

Figure 4:
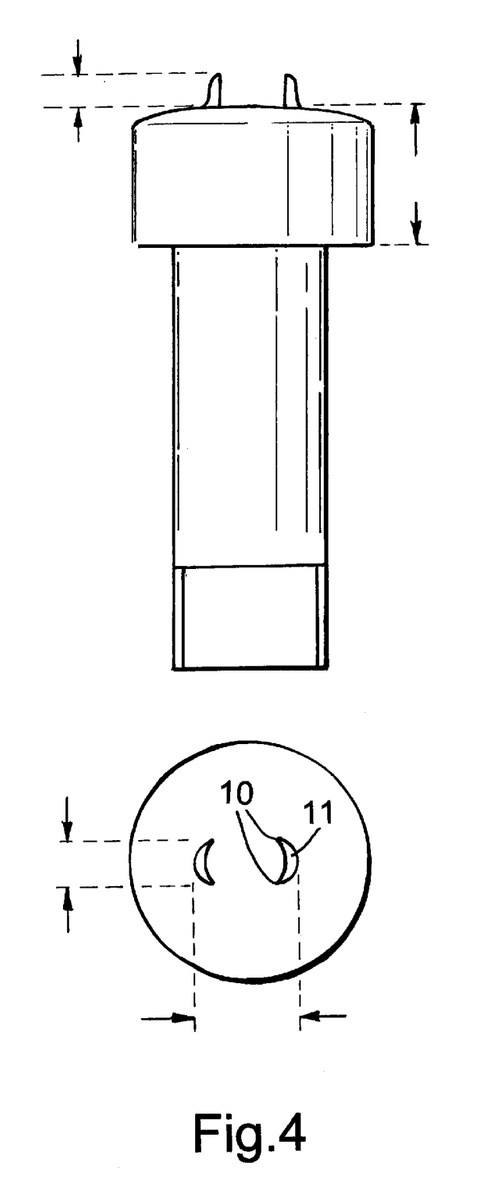
Figure 5:
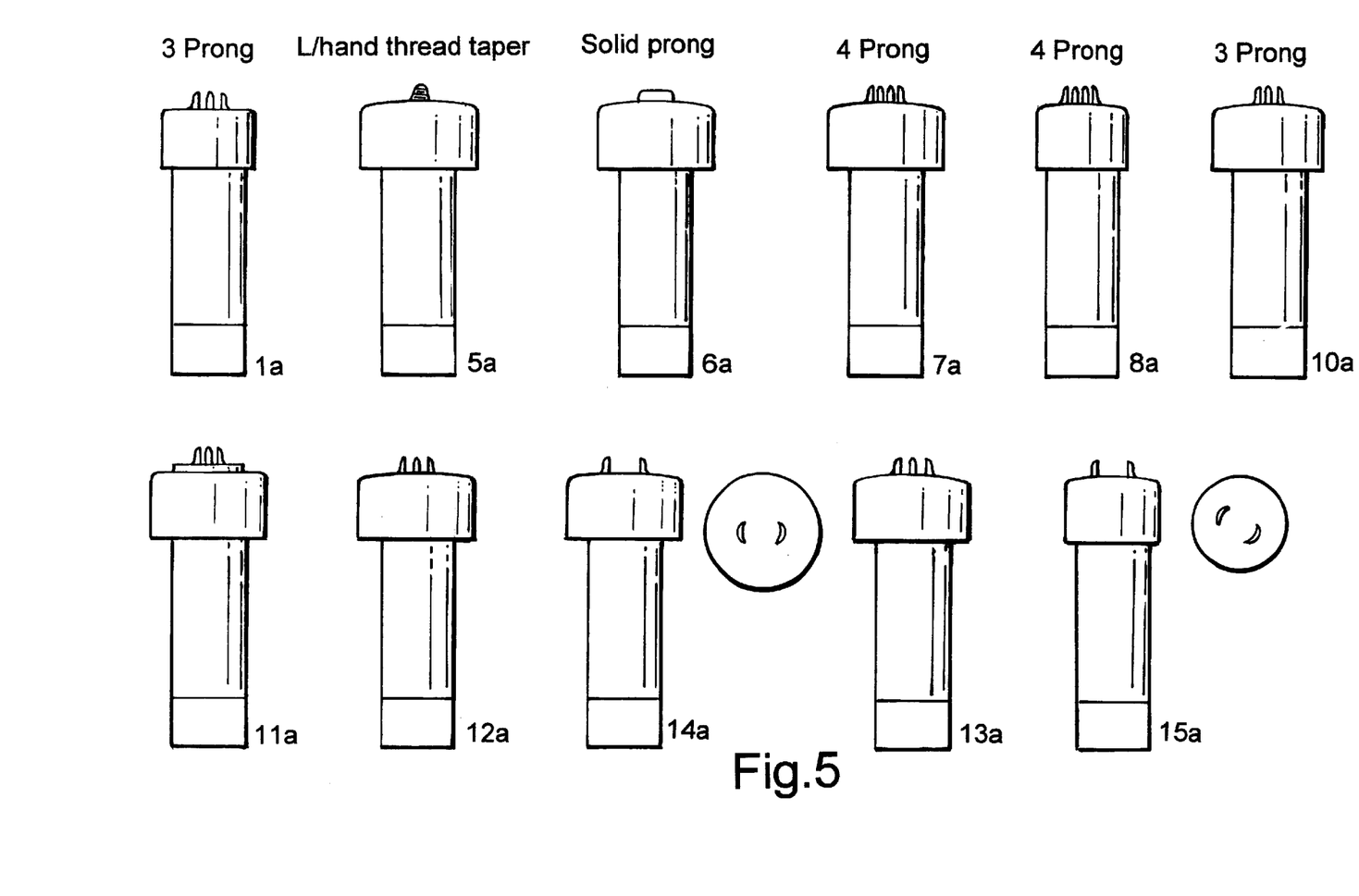

Tool Design:

The design of the tool is, of course, of paramount importance in friction stir welding. The tool must be able to plunge into the lead at the start of the weld, provide sufficient frictional heat to soften the material, and allow the material to pass from the front of the weld to the rear without leaving any cavities. Whilst a number of design concepts which have been investigated for lead and other materials, trials in this work have established that a whisk type tool, as shown in FIGS. 1, 3, 4 and 5 gave the best results. In this design, the separation of the whisk probes leads to a fairly wide weld, ensuring a large area of penetration into the lower material. Sketches of the various tools used are shown in FIG. 5.

In the case of lead sheet, the most reliable welds were obtained with tool 14(a). Typical dimensions for this tool for use with 1.8 mm thick lead sheet are shown in FIG. 4. These dimensions are given by way of example only. However, satisfactory results could also be obtained with the other multi-pronged tools shown in FIG. 5 by carefully controlling the operating parameters (see below). The single pronged tools in FIG. 5 did not give such good results.

Substrate

The substrate under the sheets has a significant influence on the quality and nature of the final weld. Steel is one option that was investigated but this is uncharacteristically hard and is also a good conductor of heat. However, reliable results could be obtained when welding over steel. Further tests were carried out using the more realistic geotextile underlay laid over wood. This is the sort of material that would be found in practice under a flat lead roof.

This had two effects on welding. First of all, the geotextile is a fairly efficient insulator, preventing heat flow from the lead into the steel; secondly, the material is very compliant, and can effectively reduce the downforce on the tool if the same registered tool position is used. To provide suitable welding conditions the geotextile material will be temporarily compressed as the rotating tool moves along the weld seam.

The effect of heat conduction is a significant factor in the difference between process conditions for steel and wood substrates. Process trends indicated that a relative significant increase in the traverse rate would be necessary when welding is carried out on top of geotextile/wood substrate materials.

Typical results are shown in Table 1. These experiments were conducted using a vertical milling machine to weld two 1.8 mm±0.09 mm lead sheets in a lap weld.

The welding conditions used to produce test welds 38g–43g were used to produce welds for tensile test specimens T1–T4 (see tables 3 and 4). Although these conditions used to produce the welds were not optimised, the test results gave tensile values close to that measured from similar parent material tensile results.

Probe Angle

Tests were carried out with a tilt on the tool, generally of 3°. This produced a very significant increase in quality, and enabled much higher rotational and travel speeds to be used. In fact, the upper limit on rotational speed was dictated by the partial fusion of the geotextile layer, and its subsequent fusion to the lead. Since the ultimate use of this process will be outside, tolerance to water would be a distinct advantage. Some trials were therefore undertaken where the lead sheet was completely underwater, and yet this did not seem to adversely influence the quality of the weld.

Figure 6:
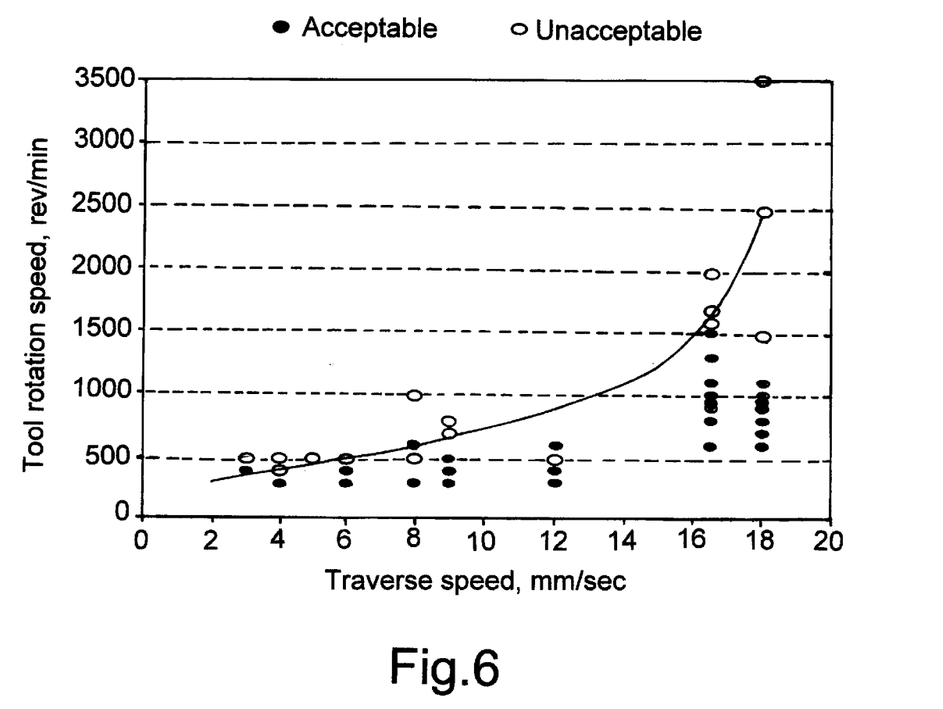
FIG. 6 shows a typical plot of tool rotational speed vs traverse speed.

In this phase of the work, tests were conducted under various conditions to establish the range of conditions for which satisfactory welds could be made. During this phase, tests were carried out to show that it was possible to achieve a travel speed of 1 m/min (16.6 mm/sec) with a satisfactory weld quality. The results are shown in FIG. 6, and all data relates to tool 14a, used with a 3°tilt, on a geotextile over wood substrate. At low travel speed and high rotation speeds, it is difficult to prevent surface voids. Moreover, such conditions also result in melting of the geotextile, and its adherence to the lead, which is unacceptable for most applications. Satisfactory welds can be made at travel speeds below 16.7 mm/sec, if a suitably slow tool rotation speed (<400 rev/min) is used, but there is generally no advantage to operating in this area. It is believed that travel speeds beyond 18 mm/sec (the fastest investigated) may be possible. Machine capabilities prevented such speeds being used.

The data obtained are summarised in Table 2. In this part of the programme, 75 welds were made, each witnessed by representatives of the Lead Sheet Association. All welds were made with tool 14a, and using an angle of 3°. Initial trials (welds 1–7) were not entirely satisfactory, but a closer examination revealed that the wooden substrate was uncharacteristically soft, and the problem was resolved by replacing the wood with a harder piece. Welds 8–51 were all made with the same condition (travel speed 16.6 mm/min, rotational speed 950 rev/min), and gave good results. Radiographic examination of sample welds produced from this group gave no indication of any sub-surface defect. The temperature of the tool and the lead were monitored using a contact thermometer, and the results are indicated in Table 2. In some cases the lead was either cooled or preheated, so simulate the extremes of weather conditions. Perhaps surprisingly, the temperatures after welding were little different to those measured on other welds.

Welds 52 and 53 used a tar paper underlay instead of the geotextile cloth. The welds appeared to be good, although there was some melting of the tar.

The effect of soft wood was explored in welds 54–70. In general this resulted in an intermittent void, although this was not always particularly serious. Welds 57–60 employed very fast (30 mm/sec) or slow (12 mm/sec) travel speeds, but the results were similar. However, some melting of the geotextile was observed in the slower speed welds, as expected. Better results were obtained in welds 62–70, where a faster rotational speed (1100 rev/min) was used. Occasional melting of the geotextile demonstrated that this would be the upper limit of rotation speed.

The final series of welds (70–75) were made onto a concrete substrate, with generally acceptable results.

Figure 7:
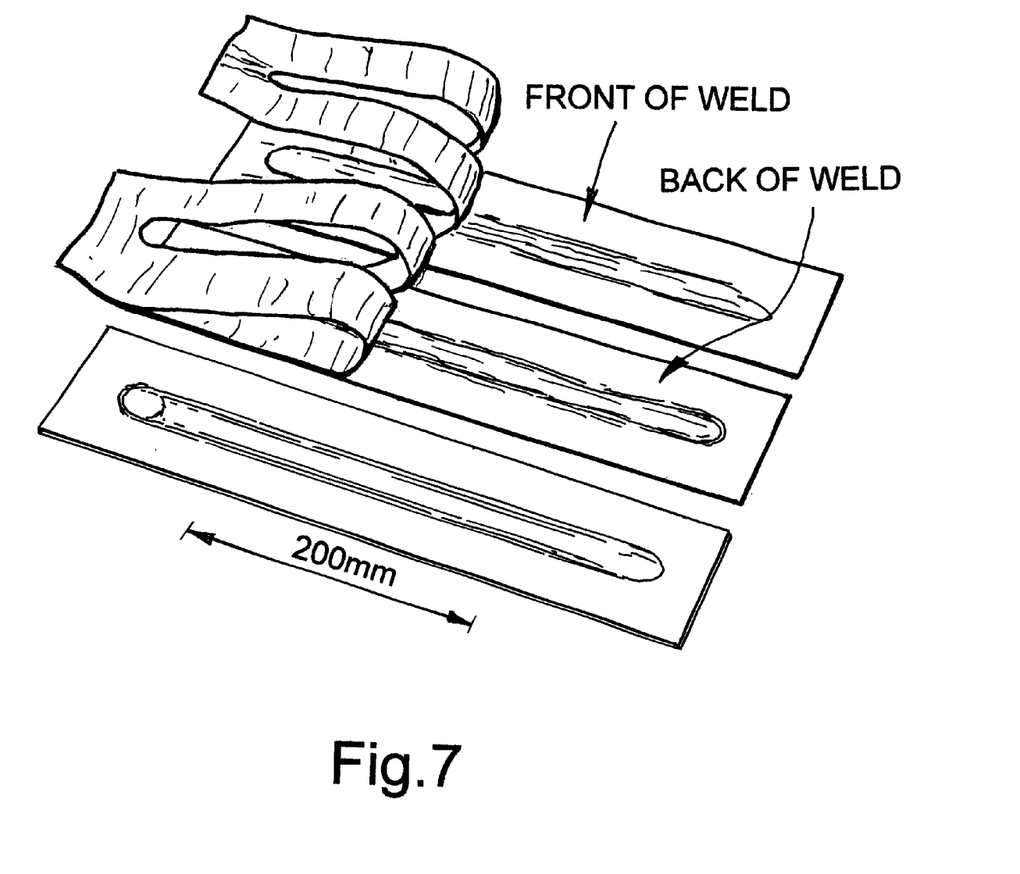
FIG. 7 shows the results of typical peel tests.

In almost all cases, satisfactory results were obtained in pull tests, i.e. the failure occurred in the parent material rather than in the weld. The only exceptions to this were in a few welds made on the soft wood substrate, when the presence of surface voids indicated poor weld quality and when welding lead sheet which varied in thickness and did not have a consistent thickness, typically that found with a cast material. In the majority of peel tests, the parent metal failure occurred in the top lapped plate. Many examples where the parent metal failure occurred in the lower lapped plate were also observed. This aspect of parent metal failure location indicated that the effect of the friction stir welding technique was fairly well balanced, i.e. there was no significant difference between the top plate and the effect of the rotating shoulder and the bottom plate and the effect of the rotating probe within the lower plate, as shown in FIG. 7.

Metallographic Examination

Figure 8:
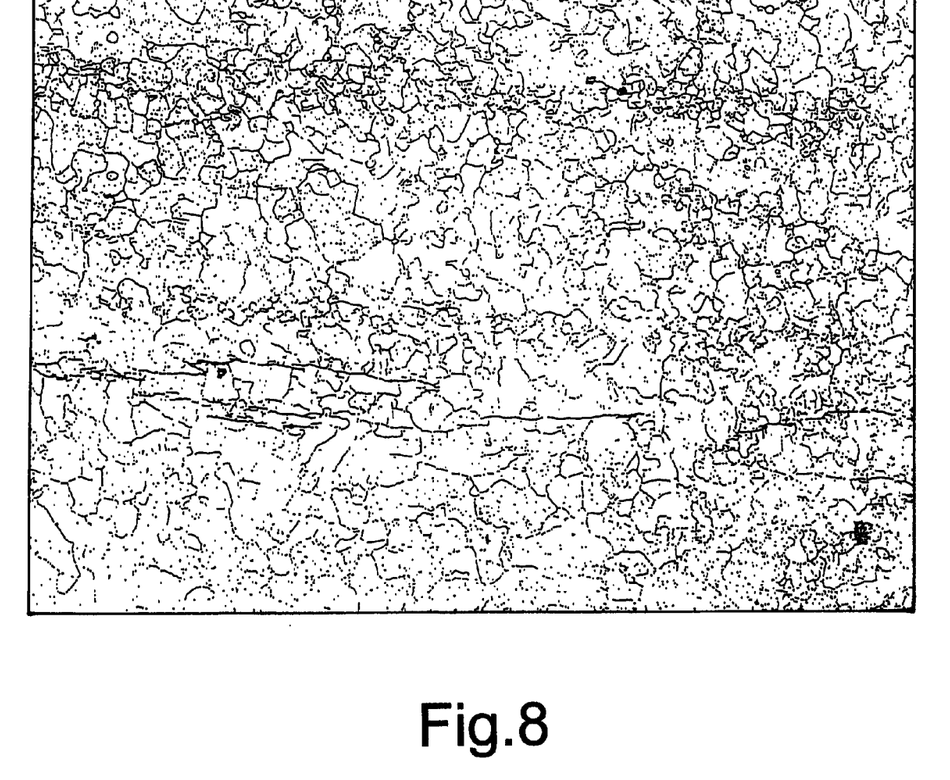
FIG. 8 shows microstructure of successful weld.

An examination of the microstructure was made on a few selected welds (114g and 141g). The weld nuggets were invariably fine grained, showing that recrystallisation had occurred. The welds were defect free, except for occasional strings of inclusions, believed to be lead oxide. A microsection taken from an underwater weld is shown in FIG. 8.

Instrumentation Data

A linear slide was modified and suitable load cells fitted to monitor axial and traverse force. An electronic device was fitted to capture current consumed during machine running under no load and under optimised welding conditions. Ten welds using a 25 mm dia (type 14a) rotating tool at 3° tilt have been carried out. A typical instrumentation data sheet is attached under Appendix 2. To show the inter-relationship and sequence of process events, the instrumentation data are included on one chart.

| Summary of Data | |
|---|---|
| Average maximum downforce | 188.31 kg |
| Average maximum traverse force | 38.29 kg |
| Rotating head - average maximum power drawn from the mains during welding | 2,855.6 W |
| Rotating head - average maximum power drawn from the mains under no load conditions | 2,729 W |
| Rotating head - power drawn from the mains by welding operation | 126.9 W |
| Traverse table - average maximum total power drawn from the mains during welding | 314 W |
| Traverse table - average maximum power drawn from the mains under no load conditions | 272 W |
| Traverse table - power drawn from the mains for welding operation | 42 W |

The latter current consumed data are those measured during friction stir welding trials on TWI's milling machine designated 857, and are representative of the transmission system and machine characteristics associated with this machine.

Conclusions

An extensive programme of work has been undertaken to further investigate friction stir welding of lead sheet. The following conclusions have been reached:
1. It is possible to make high quality welds in 1.8 mm thick rolled lead sheet manufactured to the appropriate standard using the friction stir process.
2. Tool design and inclinations are both critical. Providing the correct tool design and inclination are used, good welds can be made over a wide range of conditions.
3. Lead can be satisfactorily welded in the wet using friction stir welding, with no apparent loss of quality.
4. The process has been shown to be very repeatable.

It will be appreciated that the whisk design of probe enables plasticised material to flow around and through the prongs. The degree of whisking can be increased if necessary by having three (tools 10a, 11a, 12a, 13a) or four (7a, 8a) prongs as illustrated in FIG. 5. As well as carefully controlling the depth of each prong, the prong profile is also important. Crescent-shaped prongs as shown in FIG. 4 have proved to be particularly effective. The prongs are effectively in the form of curved blades, the leading edge 10 of which cuts into the metal as the probe rotates. The thicker region 11 forces its way through the metal causing plastic deformation. This is repeated many times a minute as the probe rotates.

This example is just one type of blade shape that could be used. Elongate diamonds, needle point and curved blades can be used in straight or curved configurations as required. The prongs can be straight sided, tapered, threaded or ridged as required. Generally, however, the probes tend to be slightly tapered away from the tip region as illustrated.

The material of the probe is obviously harder than the workpieces. Hot work steel, high speed steel or other durable metals can be used as well as ceramic and other synthetic materials. Preferably the surface of the probe head which comes into contact with the workpiece is highly polished.

Figure 9:
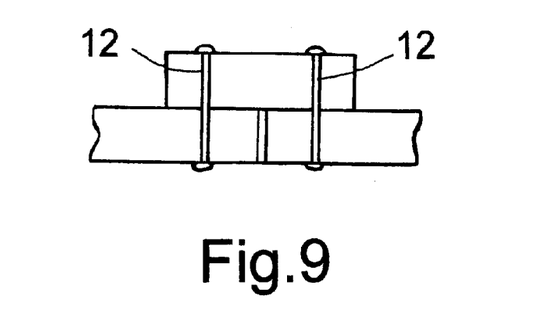
FIG. 9 shows an overlapped butt joint.

A further important advantage of this method is that the lead surface requires no preparation. Furthermore, various different types of joint can be formed as well as lap joints. A butt joint can be formed by butting together two sheets and overlaying the joint with a strip and forming two welds side by side. This is illustrated in FIG. 9.

In summary aspects of this work provide:
1. A method of joining lead sheets without the need for a naked flame as required in conventional joining methods.
2. A tool design which allows fast linear weld speeds in a lap joint of lead sheet without weld flaws or inclusion being a faster joining process than any conventional alternatives.
3. A method of joining lead sheet which can be applied in all weather conditions.

4. A method of joining lead sheet which offers greater protection to the building fabric, by the avoidance of hot working, meeting a recent imposed workplace restriction on the use of naked flames whilst working on roof structures.
5. A method of joining lead sheet which enhances the Health and Safety of the workplace and thereby protecting the public at large.
6. A quality joining method which enhances the fundamental qualities of lead sheet as a weather protecting membrane in Building and Construction.

Figure 10:
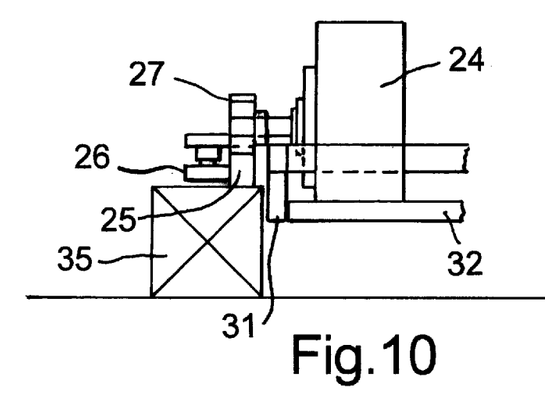
FIGS. 10 and 11 show end and side elevation cross sections respectively of a mobile welding machine according to the present invention.
Figure 11:
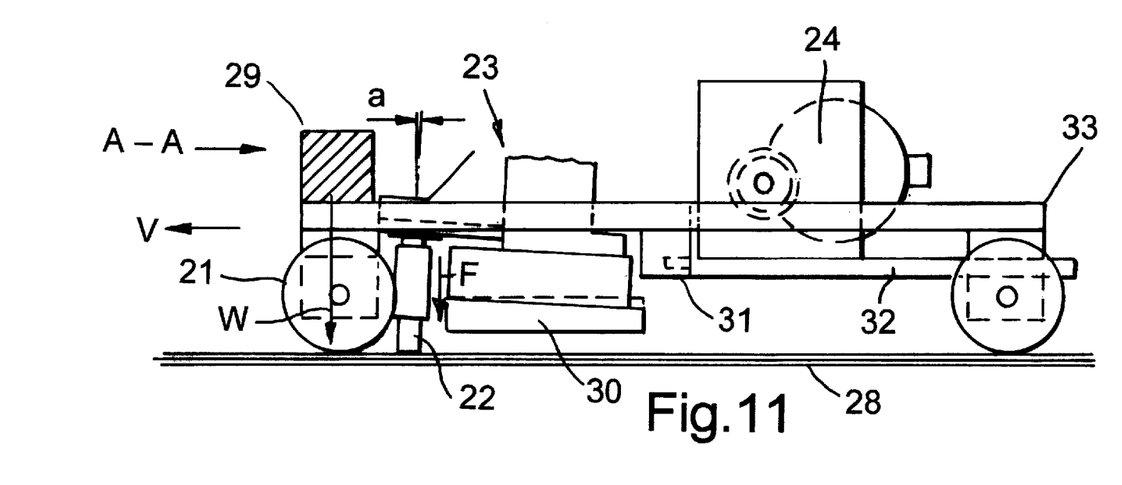

Turning now to the welding machine itself, one embodiment is illustrated diagramatically in FIGS. 10 and 11. The machine is carried on wheels 21 which are able to traverse the welding head across two pieces of lead sheet 28 required to be joined to form a lap joint. These transport wheels 28 are mounted on a base 33 carrying the drive system and welding apparatus. The base 28 acts as a body on which these other components are mounted.

The drive system 24 comprises a drive motor and gear box arrangement which provides the motive power to drive the machine forwards in the horizontal plane. In a preferred embodiment the drive system 24 is mounted on a pivoted base plate 32, hinged about point 31, which enables the drive to flex with any changes in position of the geared drive rack (see below) so accommodating any unevenness in the lead sheet being welded. The drive is converted to linear motion via a pinion gear 27 and a geared rack 25.

It is clearly important to keep the machine on a predetermined track in order to produce a straight weld in exactly the desired position. In this example this is achieved by using a temporary track 35 incorporating a geared rack 25. This is mounted on a heavy base which is laid alongside the joint region. The track is in sections such that a number of sections can be laid end to end along the complete length of the desired joint. The sections can be joined together for added stability by using any conventional joining means such as bolted connection pieces.

In use, a pinion gear 27 which may be toothed engages with the toothed rack 25. A system of cam followers 26 located on either side of the track 35 keeps the machine in the proper alignment and steers it in the correct direction.

An alternative to using a rack 25 and pinion 27 method together with temporary track 35 is to provide the welding machine with endless articulated tracks such as Caterpillar (Registered Trade Mark) type track. Any type of endless articulated tracks such as those used for running tractors and other work vehicles can be used. By using these types of articulated tracks the vehicle can more easily be maintained on a substantially straight course in order to produce a straight weld.

It is also possible for the track welding machine vehicle to be provided with remote control equipment. Any type of conventional remote control system can be used such a radio control. This enables the vehicle to be easily guided along a path determined by the user.

The welding tool or probe 22 is rotated at a fixed speed via a drive system, which is clamped to a slide 33 which enables the tool to "float" in a plane a° to the vertical. The angle "a" is achieved by mounting the slide assembly on an angled block 30. The nominal angle at which the tool is set is 3° to the vertical but, in typical applications, it can tolerate ±2° around this setting to accommodate unevenness in the lead sheet and its relative position to the weld plane.

The tool is forced by force F into the workpieces being welded by a loading system comprising weights or springs which are mounted off the slide. In order to counter-balance this downward force F weights are added 29 to the base plate 33 to provide a load W. The depth of immersion of the tool into the workpieces is controlled and set by "free running" horizontal roller(s) (not shown) positioned either side of the rotating tool. These roller(s) also serve to flatten any undulations in the workpiece and a following roller can serve as a heat sink thereby helping to disperse the elevated welding temperatures. With the probe rotating and the linear drive engaged, the mobile machine traverses across the workpiece creating a friction weld in its path. Using this technology, welding speeds of up to 1 metre per minute can be achieved using this novel and inventive mobile welding machine.

It will be appreciated that this arrangement provides a wheeled base on which is mounted a probe and the necessary drive means to rotate it. This extends beneath the machine and into any workpiece below it. The probe can be offset from the vertical by any desired angle. The base and probe are weighted as necessary to give the desired penetration of the probe into the workpiece(s). A drive mechanism engages a track assembly to propel the machine across the workpiece. Having completed one weld the track is simply moved to the next workpiece and so on until the job is complete.

It is important that the machine is capable of producing a complete weld across the entire workpiece, including up to the edges. In a preferred embodiment the probe 22 is located at or in front of the front edge of the body 33. In this way the machine will create a weld up to the edge of a workpiece. By turning the machine around and arranging the probe so that it is symmetrically placed with respect to the track, then the weld can be completed in each direction. That is to say, the probe lines up with the desired joint line in whichever direction the machine is pointing when it is engaged with the track. In practice, the track is laid adjacent to the desired joint line and the machine traverses the workpiece from one side to another. Any unjoined region is covered by simply reversing and repositioning the machine.

This arrangement works equally well if the probe is located at or beyond the rear of the base 33.

As an alternative method of finishing the edges of a weld a hand-held equivalent of the tool described above may be provided. A probe (not shown) driven by an electric motor is mounted on a wheeled device such that downward pressure by the operator on the motor or device itself creates the required downward force W. Typically a triangular arrangement of rollers with the probe mounted forward of two in-line rollers is provided. The third roller at the apex of the triangle smoothes over the weld and acts as a heat sink.

The probe is mounted at the required angle of 3°±2° and the depth is set by adjusting the amount that the probe head extends below the rollers.

This machine is guided by hand rather than by a track and the skilled operator keeps it on course and progressing forward at the desired speed. Alternatively, the final joints can be made by conventional lead welding or burning Although developed especially for lead roofing, this machine can be used in any application where workpieces must be joined in a lap or butt joint fashion. Specifically, it can be used with any probe, for example probes such as are described in WO93/10935 or WO95/26254.

In summary the present invention provides:
1. A machine capable of creating a homogenous weld on lead sheet;
2. A machine that travels at a constant speed in a known direction producing a quality lead weld;
3. A machine that converts a theoretical process to a practical application;
4. A machine that can be transported to an external site for lead sheet welding that avoids the more hazardous alternative of lead welding using a naked flame;

5. The drive system fulfils two requirements; it provides the forward motion by converting a rotational movement into a linear one, and via a system of cam followers it keeps the machine travelling in a predetermined direction;
6. A floating drive that enables continuous drive irrespective of any undulation in the lead sheet.

What is claimed is:

1. A mobile friction welding machine comprising:
   a wheeled body adapted to support and carry a rotatable probe;
   a rotatable probe incorporating a probe incorporating a probe head having a plurality of protrusions suitable for creating a friction weld joint in work pieces to be joined when the probe head is rotated at speed;
   a means of rotating the probe at a speed suitable for forming a joint region in the work pieces;
   a track assembly adapted to guide the friction welding machine across the work pieces;
   a drive means attached to or associated with the body and adapted to drive the welding machine forward along the track assembly during use of the machine;
   a loading system adapted to place a downward load on the probe and to urge it into the work pieces;
   the machine being adapted, in use, to move across the work pieces and to form a joint region in the work pieces as it moves.

2. A friction welding machine according to claim 1 wherein the rotatable probe head comprises two crescent-shaped protrusions symmetrically displaced around the rotational axis of the probe.

3. A mobile friction welding machine as claimed in claim 2, wherein the concave surfaces of the crescent-shaped protrusions are directed substantially towards but displaced from the axis of rotation of the probe.

4. A mobile friction welding machine according to claim 3, wherin the probe head is displaced from the plain perpendicular to the work pieces, the inclination being away from the general forward direction of travel of the machine.

5. A friction welding machine according to claim 1 wherein the track assembly comprises one or more endless articulated tracks incorporated around the wheels of the wheeled body.

6. A friction welding machine according to claim 1 wherein the track assembly comprises a series of track sections configured to be joined together to form a track of required length.

7. A friction welding machine according to claim 1 wherein, in use, the probe is displaced 3°±2° from a plane perpendicular to the workpieces, the inclination being away from the general forward direction of travel of the machine.

8. A friction welding machine according to claim 1 wherein the track assembly comprises a geared rack adapted to engage with geared wheels associated with the drive means.

9. A method of friction welding suitable for joining workpieces having a hardness and forming a joint region therebetween comprising the steps of:
   (i) offering a probe of material harder than the hardness of the workpiece to the workpiece surfaces in the joint region, a head region of the probe contacting one or both workpieces;
   (ii) causing a rotational movement between the probe and the workpieces while urging the probe and workpieces together whereby frictional heat is generated in the joint region so as to create a plasticised region in the workpieces around the probe; and
   (iii) removing the probe or advancing the probe along the joint region and allowing the plasticised region to solidify and thereby join the workpieces together wherein the head region of the probe incorporates a plurality of protrusions adapted to penetrate the workpieces.

10. A method according to claim 9 wherein the protrusions on the probe head are so sized and shaped that they fully penetrate the workpiece nearest the probe but only partially penetrate the other workpiece.

11. A method according to claim 9 wherein the probe head incorporates two crescent-shaped protrusions symmetrically displaced around the rotational axis of the probe.

12. A method according to claim 9 wherein the probe head incorporates two crescent-shaped protrusions symmetrically displaced around the rotational axis of the probe and wherein the concave surfaces of the crescent-shaped protrusions are directed substantially towards but displaced from the axis of rotation of the probe.

13. A method according to claim 9 wherein the probe is propelled across the workpieces using a tracked device.

14. A method according to claim 9 wherein the probe is mechanically propelled across the workpieces using a tracked device wherein the track comprises one or more articulated tracks.

15. A method according to claim 9, wherein the probe head incorporates two protrusions.

16. A method according to claim 9, wherein the probe head incorporates three or four protrusions.

17. A method according to claim 9, wherein the protrusions take the form of slightly tapering cylinders, the taper narrowing towards the tip of the protrusion.

18. A method according to claim 9, comprising the further step of displacing the probe slightly from the plane perpendicular to the workpieces.

19. A method according to claim 9, wherein the probe is displaced in use about 3° from the plane perpendicular to the workpieces, the inclination being away from the general forward direction of travel of the probe.

20. A friction welding probe suitable for joining workpieces and forming a joint region therebetween wherein:
   said probe is of material harder than said workpiece material in use, and said probe comprises a head region adapted to contact one or both workpieces is use; and
   the head region of the probe is substantially convex in shape and incorporates a plurality of protrusions adapted to penetrate the workpieces in use; such that in use, when the head region of the probe contacts one or both workpieces and rotational movement is caused between the probe and the workpieces while urging the probe and workpieces together whereby frictional heat is generated in the joint region, a plasticised region is created in the workpieces around the probe, and when the probe is removed or advanced along the joint region, the plasticised region is allowed to solidify and thereby join the workpieces together.

21. A probe as claimed in claim 20, wherein the probe head incorporates two protrusions.

22. A probe as claimed in claim 20, wherein the probe head incorporates three protrusions.

23. A probe as claimed in claim 20, wherein the probe head incorporates four protrusions.

24. A probe as claimed in claim 20, wherein the protrusions are symmetrically displaced around the probe head about the rotational axis of the probe.

25. A probe as claimed in claim 24, wherein the protrusions are substantially crescent-shaped in cross-sectional profile.

26. A probe as claimed in claim 25, wherein the probe head incorporates two protrusions.

27. A probe as claimed in claim 25, wherein the probe head incorporates four protrusions.

28. A probe as claimed in claim 25, wherein concave surfaces of the crescent-shaped protrusions are directed substantially towards but displaced from the axis of rotation of the probe.

29. A probe as claimed in claim 20, wherein the protrusions are substantially crescent-shaped in cross-sectional profile.

30. A probe as claimed in claim 29, wherein concave surfaces of the crescent-shaped protrusions are directed substantially toward but displaced for the axis of rotation of the probe.

31. A probe as claimed in claim 29, wherein the probe head incorporates two protrusions.

32. A probe as claimed in claim 29, wherein the probe head incorporates three protrusions.

* * * * *